United States Patent

[11] 3,571,892

| [72] | Inventor | Marvin Levy<br>Philadelphia, Pa. |
|---|---|---|
| [21] | Appl. No. | 789,858 |
| [22] | Filed | Jan. 8, 1969 |
| [45] | Patented | Mar. 23, 1971 |
| [73] | Assignee | Majestic-Penn State, Inc.<br>Philadelphia, Pa. |

[54] CONVEYOR SYSTEM
8 Claims, 5 Drawing Figs.

[52] U.S. Cl. ................................................. 29/208,
29/243.53, 198/135, 198/203
[51] Int. Cl. ..................................................... B65g 23/42
[50] Field of Search ........................................... 198/135,
203, 110; 29/243.53, 200, 208

[56] References Cited
UNITED STATES PATENTS
1,131,460   3/1915   Bauwens ........................ 198/135

| 1,934,835 | 11/1933 | Weiss ........................... | 198/135X |
| 1,998,757 | 4/1935 | Hauk ............................ | 198/135 |
| 2,529,777 | 11/1950 | McInnis ....................... | 198/135 |
| 2,720,963 | 10/1955 | Stanley et al. ................ | 198/135 |

*Primary Examiner*—Robert G. Sheridan
*Assistant Examiner*—Jerold M. Forsberg
*Attorney*—Seidel, Gonda & Goldhammer ABSTRACT: A conveyor system, particularly for riveting binders, having an endless conveyor comprised of rigid link members pivotably connected together and caused to intermittently move by fluid motor means having reciprocal members. Two such motor means are operated sequentially in a predetermined manner so that one motor means reciprocates to a position so that it no longer supports a link member. This permits the link member to rotate through an arc of approximately 90°. Then the other motor means moves the conveyor through a distance corresponding generally to the length of a link member.

PATENTED MAR 23 1971 3,571,892

INVENTOR
MARVIN LEVY
BY
Seidel & Gonda
ATTORNEYS.

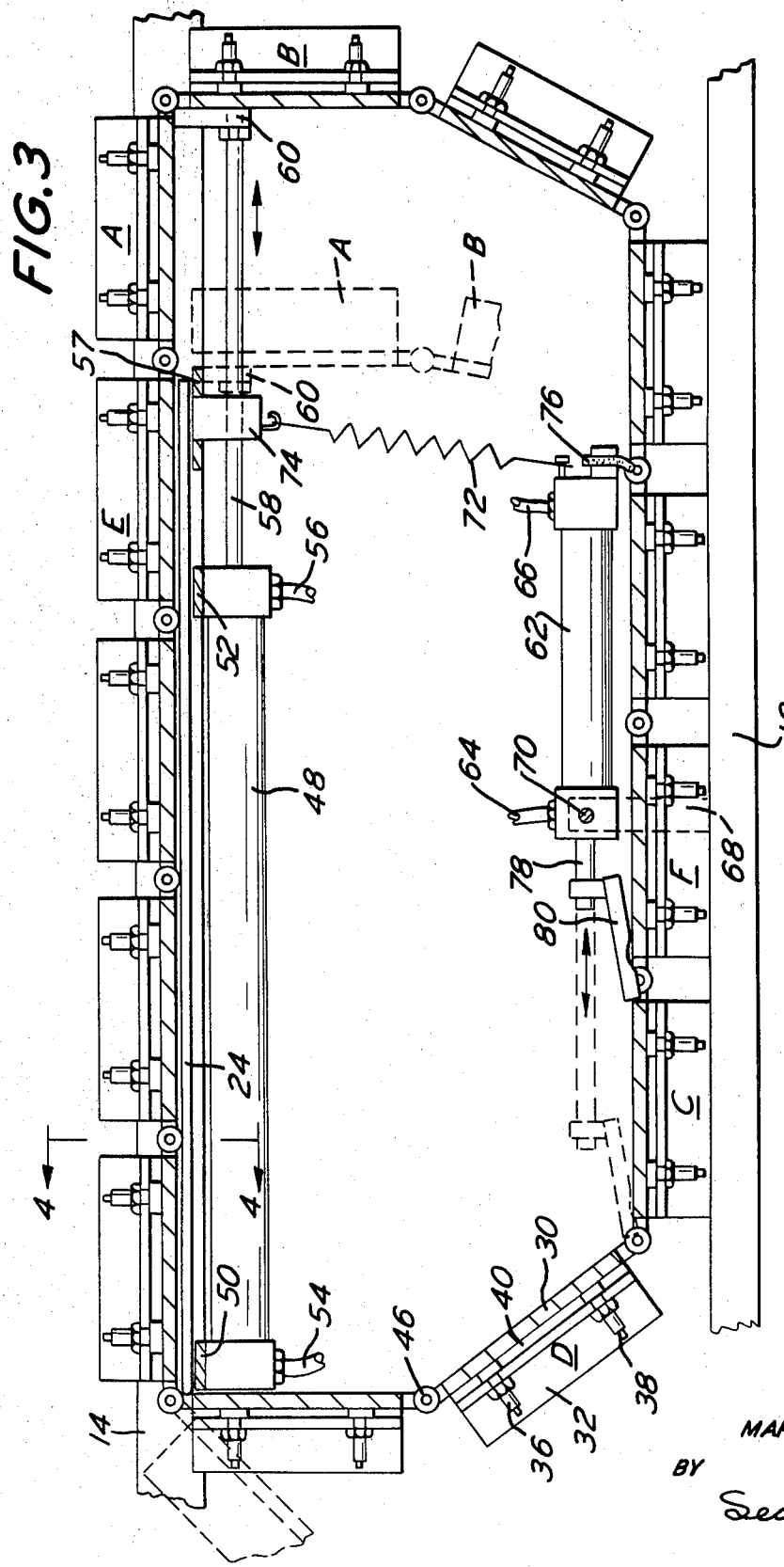

CONVEYOR SYSTEM

This invention is directed to a conveyor system which has many possible uses. For the purposes of the present disclosure, a conveyor system is being utilized in connection with a rivet setting machine for setting rivets in a loose leaf binder. The conveyor system includes an endless conveyor having rigid link members pivotably connected together. Each link member supports an anvil and has work supporting surfaces prepositioned with respect to the movable portion of the rivet setting machine for cooperation therewith.

The conveyor system of the present invention has a conveyor which is intermittently operated in a novel manner. Intermittent operation of the conveyor is effected by two motor means, which are preferably fluid motors. One motor means intermittently moves the conveyor the length of one link member by contact with a link member on the lower run of the conveyor while the other motor motor means supports a link member on the upper run of the conveyor. Before the first motor means is activated, the second motor means moves so as to no longer support the last link member on the upper run thereby permitting the last link member to rotate through an arc of approximately 90°. This introduces the slack necessary to facilitate movement of the conveyor by the first motor means.

It is an object of the present invention to provide a novel conveyor system.

It is another object of the present invention to provide a novel conveyor system having elongated rigid link members pivotably connected together.

It is another object of the present invention to provide an intermittently operated conveyor system using fluid motors to effect movement of the conveyor.

It is another object of the present invention to provide a novel intermittently operated conveyor system for use with work performing tools such as a rivet setting machine.

It is another object of the present invention to provide a novel conveyor system structurally interrelated in a manner which is simple, inexpensive, and reliable.

Other objects will appear hereinafter.

For the purpose of illustrating the invention, there is shown in the drawings a form which is presently preferred; it being understood, however, that this invention is not limited to the precise arrangements and instrumentalities shown.

FIG. 4 is a central view taken along the line 4–4 in FIG. 3.

Figure 1:
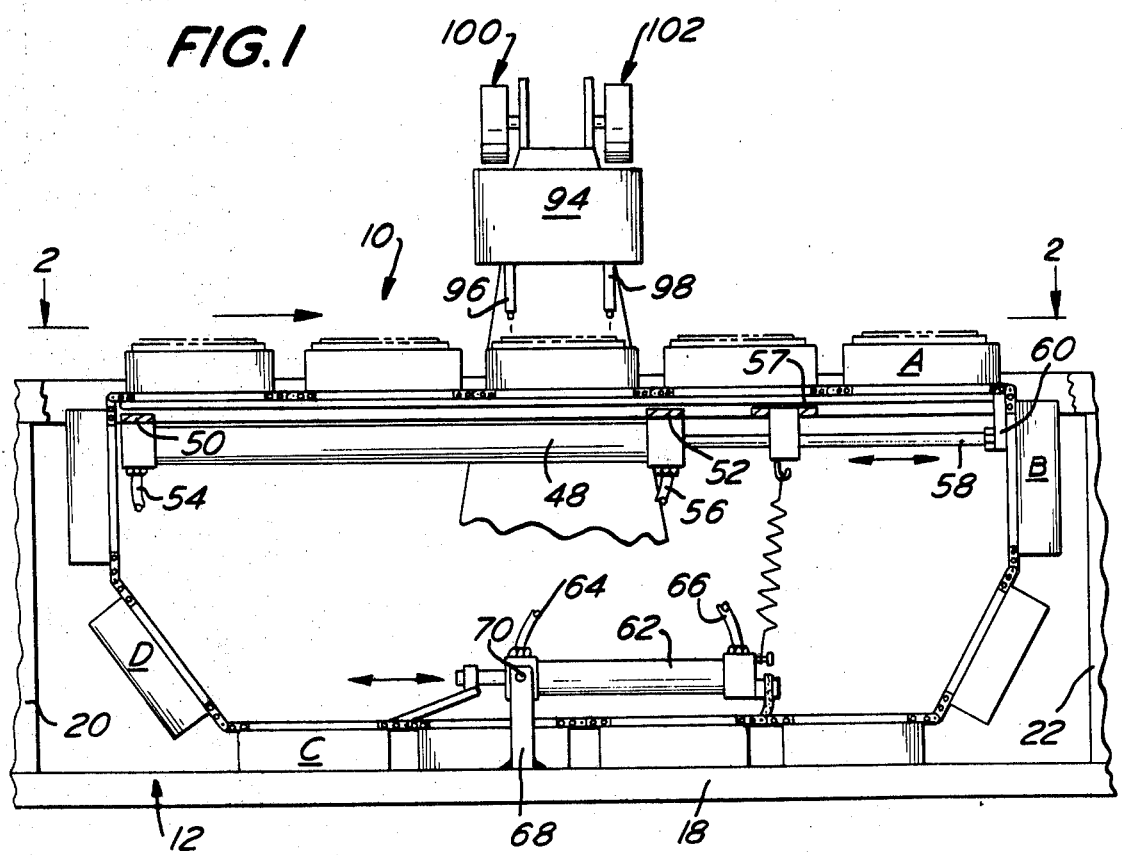
FIG. 1 is a side elevation view of the conveyor system of the present invention.

Referring to the drawing in detail, wherein like numerals indicate like elements, there is shown in FIG. 1 a conveyor system in accordance with the present invention designated generally as 10. The system 10 includes a support frame designated generally as 12 having upper rail members 14 and 16 (FIG. 2) and lower rail members 18. The rail members are interconnected by upright struts 20 and 22.

As shown more clearly in FIG. 4, the upper rail member 14 is provided with a track 24. Upper rail member 16 is provided with a track 26. The tracks 24 and 26 are horizontally disposed and extend laterally toward each other. The spacing between the tracks 24 and 26 is sufficient so as to accommodate the width of the individual link members 28 which are pivotably connected at their ends to form the conveyor.

The link members 28 are elongated so as to have a length of approximately one foot, but the link members 28 may be longer or shorter as desired. When having a length of approximately one foot, conventional drive means for intermittently operating the conveyor are either too expensive or not practical.

The link members 28 may have a variety of shapes depending upon the work performing steps to be applied to work supported thereby. For the purposes of the present disclosure, the link members 28 include a planar platform 30 having upright sidewalls 32 and 34 extending for the full length thereof. Anvils 36 and 38 are supported by a base 40 mounted on the platform 30. The anvils 36 are preferably adjustably connected to the base 40 by use of a threaded member and bolt so that the position of the anvils along the length of the base 40 may be adjusted as desired.

Figure 2:
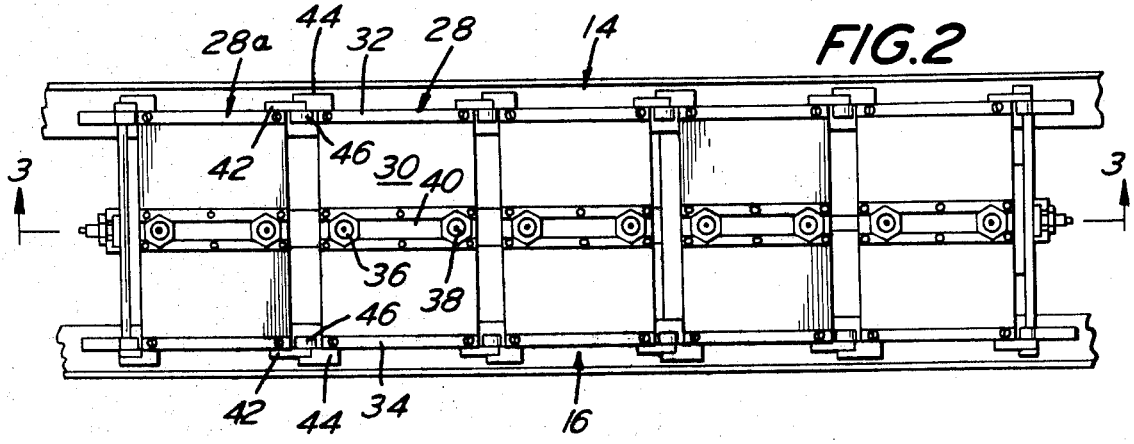
FIG. 2 is a top plan view taken along the line 3–3 in FIG. 2.

Each of the link members 28 are identical and are pivotably connected to the next adjacent link member in the same manner. Referring to FIG. 2, adjacent link members 28 and 28a are interconnected by means of brackets 42 and 44. Bracket 42 is fixedly secured to link member 28a. Bracket 44 is fixedly secured to link member 28. The overlapped ends of the brackets 42 and 44 are rotatably connected by a pin on which is mounted a wheel 46. The wheels 46 are spaced inwardly from the side edges of the link members and are adapted to ride or roll on the upper surface of the tracks 24 and 26.

An actuating means is provided for intermittently moving the conveyor. The actuating means includes a fluid motor having a cylinder 48 supported at its ends by cross braces 50 and 52. Conduits 54 and 56 are provided for introducing motive fluid into opposite ends of the cylinder 48. A piston disposed within the cylinder 48 is connected to a piston rod 58. Piston rod 58 extends through brace 74 attached to limit stop 57. A link member support 60 is fixedly secured to the free end of the piston rod 58.

The actuating means for the conveyor also includes a fluid motor having a cylinder 62. Conduits 64 and 66 are connected to the cylinder 62 for introducing motive fluid into opposite ends thereof. Cylinder 62 at its left-hand end in FIGS. 1 and 3 is pivotably supported by bracket 68 for rotation about a horizontally disposed pin 70. The right-hand end of cylinder 62 is supported only by spring 72. Spring 72 has its upper end connected to the brace 74. An oiler 76 depends from cylinder 62 and rides on the lower surface of the link members 28.

A piston disposed in cylinder 62 is connected to one end of a piston rod 78. The other end of piston rod 78 is provided with a pusher 80. The pusher 80 is angularly disposed at an angle of approximately 10° with the horizontal. The free end of pusher 80 is positioned so as to be between adjacent link members 28 when the piston rod 78 is in its retracted position. In its extended position, the piston rod 78 and pusher 80 assume the phantom position shown in FIG. 3.

Figure 5:
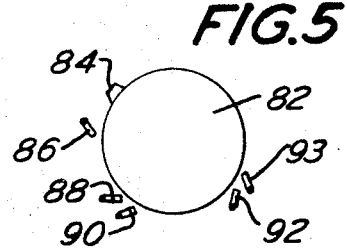
FIG. 5 is a diagrammatic illustration of a timing motor and microswitches.

In FIG. 5, there is diagrammatically illustrated a timing motor 82 having an actuating knob 84. Knob 84 is adapted to sequentially activate microswitches 86, 88, 90 and 92 which are circumferentially disposed.

The work performing tool utilized in conjunction with the conveyor includes a rivet setting machine 94 having drive assemblies 96 and 98 spaced apart by a distance corresponding to the distance between the anvils 36 and 38. The assemblies 96 and 98 are provided with feed devices 100 and 102 respectively. The assemblies are operated by an operator who controls the switch.

The conveyor 10 is operated as follows:

It will be assumed that the components are in a position shown in FIGS. 1 and 3 and that articles such as note book binders have been riveted to the covers. As soon as the riveting operation is complete, the rivet setting drive assemblies 96 and 98 reciprocate upwardly. Various ones of the link members 28 are designated as A, B, C, and D for purposes of the following description.

As soon as the assemblies 96 and 98 reciprocate upwardly, the knob 84 on timing motor 82 actuates microswitch 86. When microswitch 86 is actuated, motive fluid is introduced through conduit 56 to cause the support member 60 on piston rod 58 to move from the solid line position in FIG. 3 to the phantom position in FIG. 3 at which point it engages the limit stop 57. It will be noted that the phantom position of support member 60 is immediately to the left of the pivot point between link member A and the adjacent link member to the left thereof in FIG. 3. Since link member A is now no longer supported by tracks 24 and 26, said link member A pivots downwardly to the phantom position in FIG. 3 and thereby provide slack in the conveyor. Following the pivoting of link member A, knob 84 actuates microswitch 88.

When microswitch 88 is actuated, fluid pressure is introduced through conduit 66 to move piston rod 78 to the left of FIG. 3. As piston rod 78 moves to the left of FIG. 3, pusher 80 engages the link member C and moves it to the position presently occupied by link member D in FIG. 3. After microswitch 88 is actuated, microswitch 90 is actuated by knob 84.

When microswitch 90 is actuated, fluid pressure is introduced through conduit 54 while conduit 56 is exhausted. This causes the piston rod 58 and support member 60 to move to the right in FIG. 3 with the link member E being supported and moved thereby. As member 60 moves to the right in FIG. 3, it is engaging the bottom surface of member A and pushes the same while supporting member E. When link member E reaches the position of link member A in FIG. 3, knob 84 closes microswitch 92 to trap the motor fluid in the cylinder 48 and thereby retain the support member 60 in the position illustrated in FIGS. 1 and 3. This braces the upper run of the conveyor. Immediately thereafter, microswitch 93 is activated to exhaust conduit 66 and introduce motive fluid through conduit 64 to cause the piston rod 78 and its pusher 80 to reciprocate to the right in FIGS. 1 and 3.

As the piston rod 78 reciprocates to the right in FIGS. 1 and 3, the pusher 80 contacts the adjacent surface of link member F. This causes the cylinder 62 to rotate about pin 70 in a clockwise direction in FIGS. 1 and 3 and tensioning of spring 72. When the free end of pusher 80 reaches the gap between link member 50 and the next adjacent link member to the right thereof, spring 72 biases the free end of the pusher 80 into the gap. At this point, the piston rod 78 has come to rest in its retracted position and remains in said position. Thereafter, the assemblies 96 and 98 may be operated to rivet the next work product. It will be understood that operators are provided for feeding the work product on to the individual link members while they are supported by the lefthand end of the tracks 24 and 26. Also, it will be understood that operators or other devices will be utilized to remove the work product from the link members when they attain the position of link member A. As will be apparent from the drawing, the lower run of the conveyor is supported by the lower rail member 18.

All microswitches described above control solenoid valves for admitting or exhausting motive fluid from the cylinders.

The present invention may be embodied in other specific forms without departing from the spirit or essential attributes thereof and, accordingly, reference should be made to the appended claims, rather than to the foregoing specification as indicating the scope of the invention.

I claim:

1. A conveyor system comprising a frame supporting an endless conveyor having rigid link members pivotably connected thereto, intermittently operated fluid motor means having a reciprocal member for contacting a bottom run link member and moving the same, and intermittently operated motor means for supporting the terminal horizontally disposed top run link member and selectively permitting the same to pivot downwardly to provide slack in the conveyor to be taken up by movement of a link member by said fluid motor means.

2. A conveyor system in accordance with claim 1 wherein said fluid motor means includes a cylinder having a reciprocal piston rod, a pusher on one end of the piston rod, said pusher being adjacent the gap between adjacent link members when the piston rod is at one end of its stroke.

3. A conveyor system in accordance with claim 1 wherein said fluid motor means is pivotably supported adjacent one end thereof.

4. A conveyor system in accordance with claim 1 wherein said motor means for supporting the terminal link member includes a fluid motor having a reciprocal piston rod, and a supporting member connected to said piston rod for supporting the terminal link member from below.

5. A conveyor system in accordance with claim 1 including horizontally disposed tracks, wheels connected to said link members at the pivotable joint between adjacent link members, said wheels being adapted to ride on said tracks.

6. A conveyor system in accordance with claim 1 wherein said fluid motor means includes a piston rod having retracted and extended positions, said motor means for supporting the terminal link member including a piston rod having extended and retracted positions, a link member support on said last mentioned piston rod, and means for moving said link member support through a distance approximately equal to the length of the link members so as to permit the terminal link member to pivot downwardly and then cause the first mentioned piston rod to move from a retracted to an extended position so that it may push a link member on the lower run of the conveyor to a distance corresponding to the length of a link member.

7. A conveyor system in accordance with claim 1 wherein said fluid motor means is pivotably supported at one end and resiliently supported at its other end so as to be generally horizontally disposed and substantially parallel to and adjacent to the lower run of the conveyor.

8. A conveyor system in accordance with claim 1 including at least one rivet setting anvil on each link member, and a rivet setting machine above the upper run of the conveyor, the rivet setting machine including a drive assembly adapted to cooperate with the anvil.